United States Patent
Vegsund (10) Patent No.: US 7,775,500 B1
(45) Date of Patent: Aug. 17, 2010

(54) CONCRETE FORMING SYSTEM WITH INTERACTING BRACKETS CONNECTING STACKED FORM PANELS

(75) Inventor: Neil A. Vegsund, River Falls, WI (US)

(73) Assignee: Shaw Acquistion Corporation, Minneapolis, MN (US)

( * ) Notice: Subject to any disclaimer, the term of this patent is extended or adjusted under 35 U.S.C. 154(b) by 1192 days.

(21) Appl. No.: 11/153,099

(22) Filed: Jun. 15, 2005

(51) Int. Cl.
*E04G 17/14* (2006.01)
*E04G 17/02* (2006.01)

(52) U.S. Cl. .................... 249/219.2; 403/177; 403/218; 403/337

(58) Field of Classification Search .................... 403/13, 403/14, 178, 217, 218, 305, 335, 337, 338, 403/177; 249/219.1, 219.2, 44, 47, 192; 52/125.1, 125.2, 125.4, 125.5, 125.6, 298, 52/848, 124.2; 446/124, 125, 128; 294/89
See application file for complete search history.

(56) References Cited

U.S. PATENT DOCUMENTS

| | | | | |
|---|---|---|---|---|
| 714,199 A | * | 11/1902 | Lane | ........................... 403/218 |
| 2,086,009 A | * | 7/1937 | Walker | ........................ 52/848 |
| 2,107,427 A | | 2/1938 | Schwarzler | |
| 2,404,385 A | * | 7/1946 | Fritts | ........................... 403/337 |
| 2,753,702 A | * | 7/1956 | Dunn | ........................... 403/337 |
| 4,008,550 A | * | 2/1977 | Kaufman | ...................... 52/298 |
| 5,471,808 A | * | 12/1995 | De Pieri et al. | ............. 446/128 |
| 5,863,453 A | * | 1/1999 | Hardin | ..................... 249/219.1 |
| 5,965,053 A | | 10/1999 | Carlson | ...................... 249/191 |
| 6,237,890 B1 | | 5/2001 | Gates | ...................... 249/219.2 |
| 6,869,081 B1 | * | 3/2005 | Jenco | ........................... 403/337 |
| 6,923,484 B2 | * | 8/2005 | Braun et al. | ................. 403/338 |

OTHER PUBLICATIONS

Gates and Sons, Inc., Brochure Including 16 pages; Jan. 2003.

* cited by examiner

*Primary Examiner*—Michael Safavi
(74) *Attorney, Agent, or Firm*—Charles A. Johnson (57) ABSTRACT

A modular forming system with nesting brackets between associated stacked modular panels to join modular panels when stacked. As a part of the forming system, a modular panel is described having a forming member with a plurality of studs affixed to the non-forming surface, and a plurality of stiff-back structures affixed in a spaced-apart relationship to the plurality of studs. Each stiff-back structure includes a lower bracket having a slot therein and an upper lifting bracket having a lifting member adapted to slidably engage the slot in a lower bracket of an associated stacked panel arranged above the modular panel, and allowing the engaged brackets to be removably joined together.

12 Claims, 12 Drawing Sheets

CONCRETE FORMING SYSTEM WITH INTERACTING BRACKETS CONNECTING STACKED FORM PANELS

BACKGROUND OF THE INVENTION

1. Field of the Invention

This invention relates generally to stackable structures and more particularly to the field of forming systems having particular value in assembling concrete form systems. More specifically, this invention includes modular panels that can be assembled into concrete form systems. Still more specifically, this invention includes interacting brackets for interconnecting stacked panels and for lifting and positioning such modular panels.

2. State of the Prior Art

Form systems are well known and widely used to construct desired structures, such as walls, enclosures, foundations, and the like, from pourable and hardenable material such as concrete. To accomplish this type of construction, it is necessary to construct a form system that will define the dimensions of the desired structure. It has long been known to construct such forms at a site where the desired structure is to be constructed, and when structure has been completed, to simply disassemble the form system. Such processes require on-site assembly and disassembly is wasteful of labor and material, can interfere with the progress of other work, and must be repeated for successive jobs.

As an improvement in form systems, it has been known to utilize reusable building forms. Many reusable form systems are constructed of more durable materials, such as metals, with aluminum being a material that is both lightweight and durable. The metal reusable form systems are durable, but are expensive to maintain and repair. Further, such form systems have not proven to be as effective in constructing large structures when compared to engineered form systems.

In all form systems it is necessary to provide sufficient strength and rigidity in the form walls to withstand the lateral pressures caused by the concrete material as it is deposited within the form system. The design of the form system will utilize both the strength of form walls and the cross-tying of the form walls to prevent outward bowing or other deformation. Engineered form systems involve the determination of the dimensions and strengths of materials necessary to accomplish the construction of the desired structure. In large form systems, it is known to develop the components of the form system in sections. These sections are often to large and heavy to be manually put in place at the construction site and are constructed to be placed by use of mechanical power, such as lifts or cranes. They are disassembled using mechanical power in a similar manner.

Various lifting mechanisms have been developed to permit cranes, or other lifting devices, to attach to the form sections or components, and to lift them into place and to remove them when the need for the form system has ended. It is common for such lifting mechanisms to be specially fabricated and affixed at selected placements on form components. Such lifting mechanisms do not serve any other function, and must be constructed of sufficient strength to safely bear the weight of whatever form components are involved.

It is known that engineered form systems can have component parts that are reusable, but due to the wide disparity of dimension of desired structures, it has been necessary to maintain a large number of form components that can accommodate forming various desired structures. This is costly both in materials to fabricate the various components, and in providing space to store them. Existing form systems do not include modular form panel interconnecting mechanisms that readily accomplish stacking of modular panels and also function as lifting mechanisms.

A need has developed for modular form structures that allow engineered form panels to be assembled in various combinations, such as by stacking vertically and extending longitudinally, to define various desired form system structures.

SUMMARY OF THE INVENTION

The present invention includes modular form structures designed to be particularly well suited for ease of assembly and disassembly and for providing form structures that meet the needs of forming for various desired structures. In one embodiment of the invention there is a modular panel having sheathing of a predetermined dimension, with a facing surface and a rear surface; and a plurality of structural members, hereinafter referred to as studs, affixed to the rear surface of the sheathing. In addition there are a plurality of stiff-back members, affixed to the plurality of studs, with each of the stiff-back members having a first end and a second end. Lifting brackets are coupled to respectively associated ones of the first ends of the stiff-back members. Base brackets are coupled to respectively associated ones of the second ends of the stiff-back members, with each of the base brackets having an aperture arranged for receiving a portion of an associated lifting bracket on a different modular panel, such that each of the base brackets can nest with the associated lifting brackets to allow stacking of modular panels, and to provide a means to join the modular panel to a different modular panel.

In another embodiment of the invention a novel joining structure for joining modular panels in construction systems is described. Such a joining structure includes nesting brackets, where a base bracket includes a base plate having a first surface and a second surface oppositely disposed, and having an aperture therethrough, a plurality of mounting holes, and a first mounting structure on said first surface for mounting to an associated modular panel. The nesting brackets further include a lifting bracket for mounting on a different modular panel, and includes a second base plate having a third surface to engage the second surface of an associated base bracket, a fourth surface with a second mounting structure thereon, and a like plurality of mounting holes positioned to mate with the plurality of mounting holes on an associated base bracket. The lifting bracket includes a structure on the third surface that cooperates with the aperture in the base plate of the base bracket to aid in the positioning of the nesting brackets with respect to each other; and this structure can include a hole therethrough that allows a lifting mechanism to engage the lifting bracket when the structure is exposed, to thereby allow the associated modular panel to be maneuvered for placement and to be lifted as needed.

In yet another embodiment of the invention there is provided a forming system that incorporates a number of modular form panels, where each panel has a predetermined surface dimension and the various panel surface dimensions can be similar or of varying sizes. Each panel has a smooth panel face and a back face with a number of studs mounted to the back face, and a plurality of pairs of spaced-apart stiff-back members mounted to the studs. Each of the pairs of spaced-apart stiff-back members having a length defining the height of the panel and having upper and lower ends, with a lifting bracket mounted to associated upper ends and a mating bracket mounted to associated lower ends. The arrangement is such that various panels can be assembled in length and by stacking to provide a form face of a selected over-all required dimension by selecting panels to form the required dimension and interconnecting the lifting brackets of each lower panel with associated base brackets of an upper panel.

Still another embodiment of the invention includes a stiff-back structure that includes a pair of waler members, each having first and second ends, together with a lifting bracket coupled to the first ends of the pair of waler members and a base bracket with a slot therethrough coupled to the second ends of the pair of waler members. The arrangement is such that the lifting bracket on a lower modular panel will align with the slot in the base bracket of a stiff-back structure on a stacked modular panel such that the associated brackets nest together and form a sufficiently strong joining structure that will withstand the lateral forces that may be applied Having considered the background of the invention, the purposes of the invention, and having summarized the invention, various embodiments of the invention will be described in detail with respect to the accompanying Drawings. It is understood that the description of the various embodiments does not define the scope of the invention and that the invention is defined by the appended Claims.

BRIEF DESCRIPTION OF THE DRAWING

The invention will be described with respect to the Drawings. The following is a brief description of the Drawings, in which.

DESCRIPTION OF THE PREFERRED EMBODIMENTS

The invention relates to a modular system for constructing form structures that are useful in forming desired shapes for pourable and hardenable materials such as concrete. The modular system includes pre-engineered panels that can be constructed in various predetermined shapes, and provides a system for assembling form walls of the desired strength and dimensions. The invention allows the assembled form walls to be disassembled and permits the modular panels to be re-used. To accomplish the desired modularity and to allow assembly of modular panels in the desired configurations, the invention includes interacting brackets that function to nest between upper and lower panels, and function as a lifting structure for top exposed panels. It is necessary that the joining together and interaction of the brackets provide sufficient strength, that is moment capabilities, to withstand the lateral pressures that will be applied by the formed liquid hardenable material being placed, without bowing or allowing the joined modular panels to deflect out of their planar alignment.

In general, forming structures utilize facing material, often referred to as 'sheathing', to define the form face surface. The sheathing can be metal or a wood product such as plywood. In the case of plywood, it is usual to affix structural members, commonly referred to as 'studs', to the non-forming side to provide strength and to aid in preventing deforming of the face surface when the pourable material is installed and lateral pressure occurs on the form. The number, spacing, and dimensioning of studs will depend upon the engineered strength requirements for the proposed structure. It is also common to add one or more spaced-apart structures to stiffen the studs. Such structures can be constructed of metal or wood products, and are commonly referred to as 'stiffeners', 'walers', or 'stiff-backs', and the like. As will become apparent from the following descriptions, the current invention relates to a 'double waler stiff-back' structure, it being understood that references to such structures may alternatively also be referenced simply as a 'stiff-back' or a 'stiff-back structure'. The preferred waler material, though not required, is engineered lumber know as laminated veneer lumber, or in short as LVL. Such lumber is available commercially.

To the extent practicable, elements will be identified with the same reference numerals in the various illustrations and descriptions throughout the Detailed Description of the Inventions.

Figure 1:
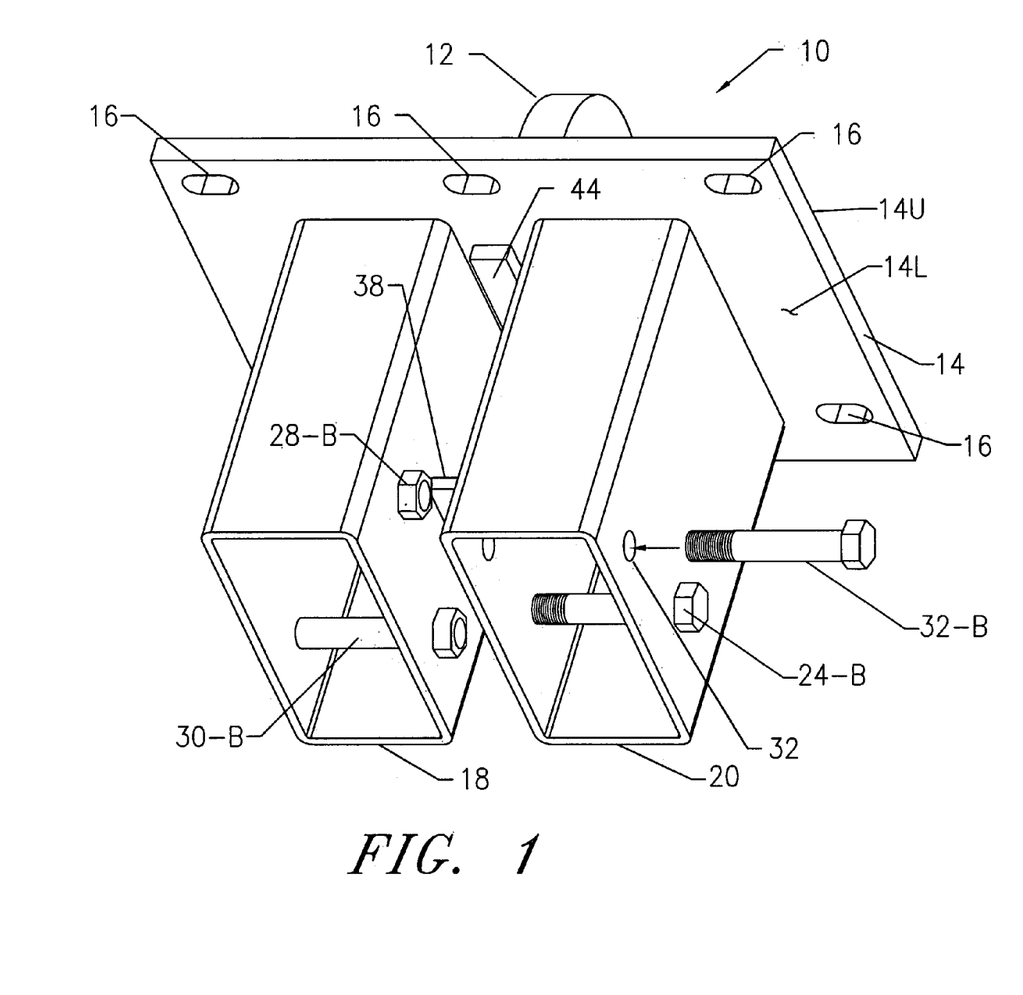
FIG. 1 is a perspective view of an upper bracket that is utilized for positioning and mating with an associated lower bracket, and for engaging a lifting mechanism.

FIG. 1 is a perspective view of an upper bracket, alternatively referenced as a lifting bracket, that is utilized for positioning and mating with an associated lower member, and for engaging a lifting mechanism. Bracket 10 supports positioning and lifting member 12 on the upper surface 14U of plate 14. The plate 14 has a number of holes 16 adjacent a portion of the periphery on three sides of the plate. These holes 16 are arranged to cooperate with similar holes in a mating bracket (not shown here), and to allow the brackets to be joined together. This joining structure will be described in more detail below. A pair of spaced-apart brackets 18 and 20 are mounted to the under surface 14U of plate 14, and are arranged to receive the ends of a pair of waler members (not shown here). The cross-sectional shape of the brackets 18 and 20 will depend upon the shape and strength requirements of the waler members for the particular panel design, and together are a mounting structure. As shown here, the shape is rectangular and adapted to receive a waler member that may be dimension material, by way of example nominally referenced as 2.5 inches by 5.5 inches, cross-section, or the like. It is understood that the size of the rectangular opening in brackets 18 and 20 will be selected to accommodate and cooperate with the cross-sectional dimensions of the waler members to which the bracket 10 is to be affixed. The dimensions of the waler members form part of the pre-engineering of the panels, and require that the brackets 18 and 20 be of a mating size to accommodate the required stiff-back dimensions. Brackets 18 and 20 have bolts and nuts 28B and 30B, and bolts and nuts 24B and 32B, respectively. These bolts are arranged to cooperate with holes in the waler ends (not shown) for affixing the bracket 10 to the upper end of the waler members. One such connective device is shown as bolt 32B aligned with holes 32, and when passed therethrough, can engage a nut (not shown). It is of course recognized that other forms of affixing the waler ends in the stiff-back brackets 18 and 20, such as by screws or the like, will be within the scope of the embodiment, though not shown in detail in the Drawings. A stiffening member 38 is affixed between the inner walls of stiff-back brackets 18 and 20 and provides lateral stiffening of these brackets to inhibit twisting, deflection, or separating.

Figure 1A:
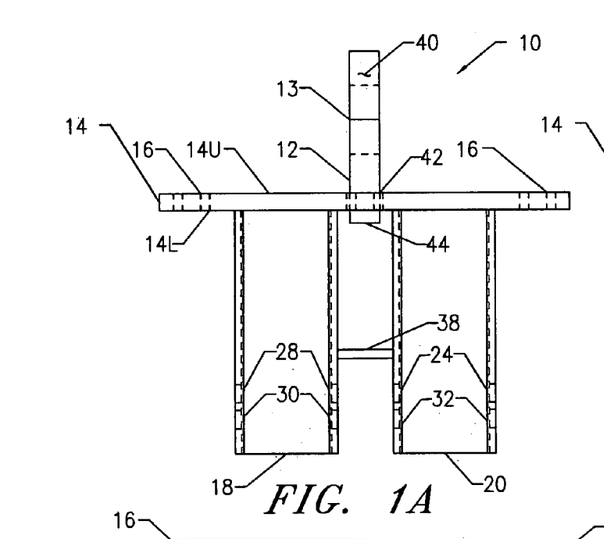
FIG. 1A is a side view of the upper bracket of FIG. 1.
Figure 1B:
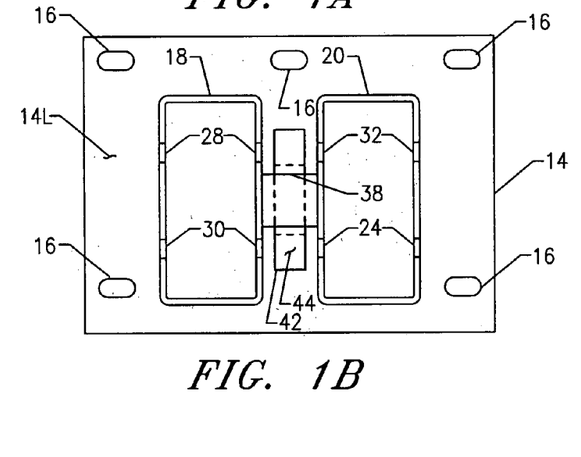
FIG. 1B is a bottom view of the upper bracket of FIG. 1.
Figure 1C:
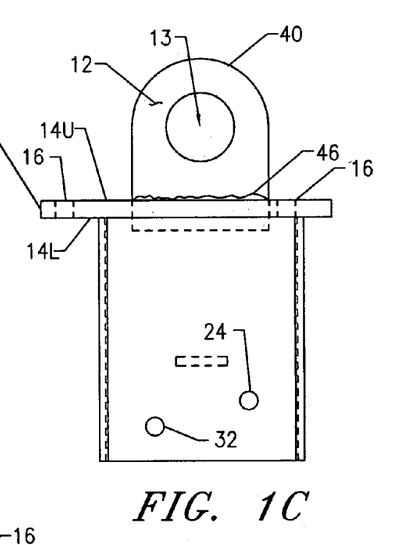
FIG. 1C is an end view of the upper bracket of FIG. 1.
Figure 1D:
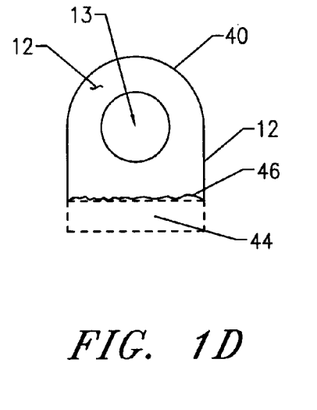
FIG. 1D is a side view of the positioning and lifting element utilized with the upper bracket of FIG. 1.

FIG. 1A is a side view; FIG. 1B is a bottom view, and FIG. 1C is an end view of the upper bracket 10 shown in FIG. 1. FIG. 1D is a side view of lifting member 12, and illustrates its form. Lifting member 12 has a hole or opening 13 that is utilized to receive a hook (not shown) or some other lifting mechanism. It also has an upper arcuate surface 40 that is adapted to cooperate with a mating bracket, as will be described below. The cooperation essentially utilizes the arcuate surface 40 to slide and position itself within the mating bracket (to be described below) without becoming snagged on any sharp corner or protrusion. Lifting member 12 is separately formed and is assembled to extend through slot 42 in plate 14, with its lower extremity 44 extending below the lower surface 14L of plate 14. When positioned, lifting member 12 is affixed to plate 14, with the preferred means of affixing being welding, for example welding bead 46. For added strength lifting member 12 can be welded both to upper surface 14U and to lower surface 14L to provide added strength. Bolts 24B, 28B, 30B and 32B are not illustrated in these FIG.s, but respectively aligned holes 24 and 32 in bracket 20 and holes 28 and 30 in bracket 18, illustrate the mounting relationship for the bolts described above. It is understood that fewer or more bolts may be utilized as necessary for any calculated holding and load lifting requirements.

Figure 2:
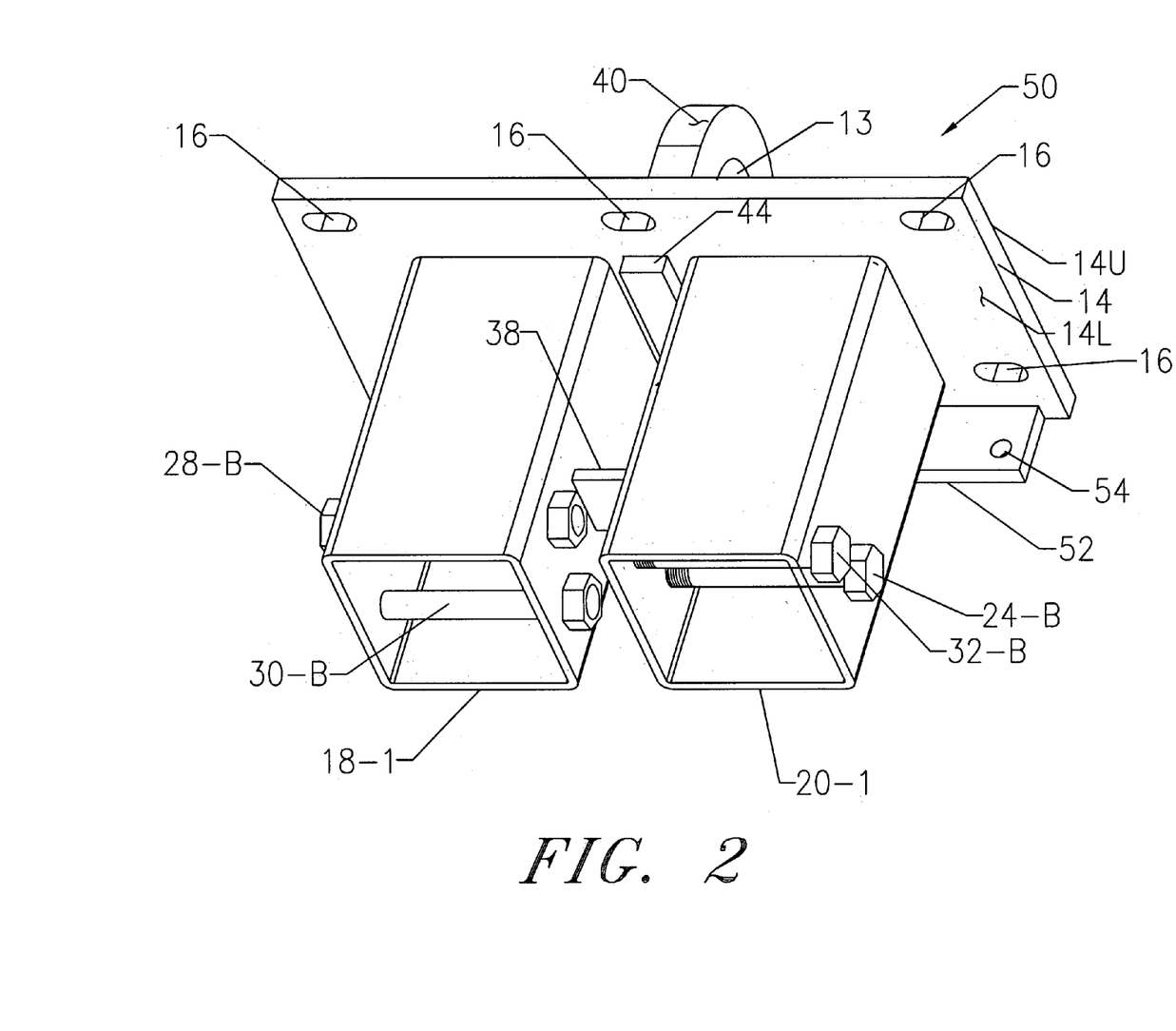
FIG. 2 is a perspective view of an alternative embodiment of an upper bracket.

FIG. 2 is a perspective view of an alternative embodiment of an upper bracket 50. This alternate embodiment of a lifting bracket 50 includes the elements described with respect to FIG. 1, and has an additional fastening member 52 downwardly extending from the under side surface 14L of plate 14. Member 52 provides additional strength in binding bracket 50 to an associated panel, as will be described in more detail below, and further assists in preventing twisting within an associated stiff-back assembly. In light weight material bracket construction, fastening member 52 can be a downwardly bent portion of plate 14. It is understood that such a fastening member can be used with lifting bracket 10. In brackets constructed of heavier materials, fastening member 52 preferably is welded to plate 14. Fastening member 52 has a number of holes 54 through it, and arranged to receive screws or bolts (not shown here) for affixing fastening member 52 to a portion of the modular panel with which the upper bracket 50 is to be used. This embodiment also illustrates that the brackets 18-1 and 20-1 have a substantially square shape to allow use with waler members that are substantially square in cross-section. Such stiff-back members are typically used with lighter duty panels than those that would employ lifting bracket 10 with 3.5 inches by 3.5 inches being a nominal characteristic cross-section.

Figure 2A:
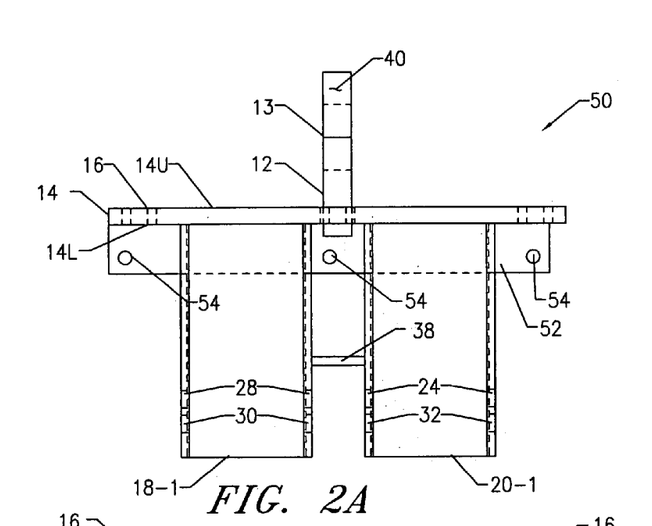
FIG. 2A is a side view of the upper bracket of FIG. 2.
Figure 2B:
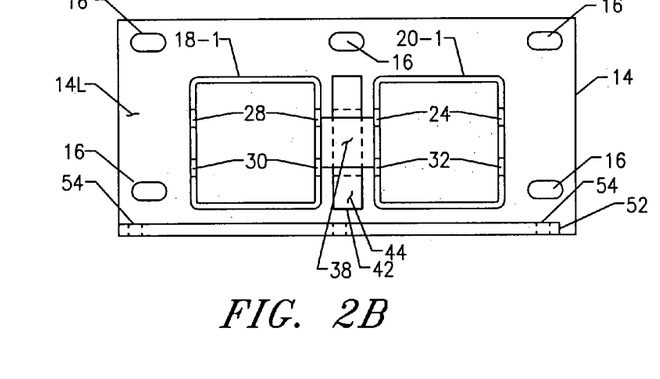
FIG. 2B is a bottom view of the upper bracket of FIG. 2.
Figure 2C:
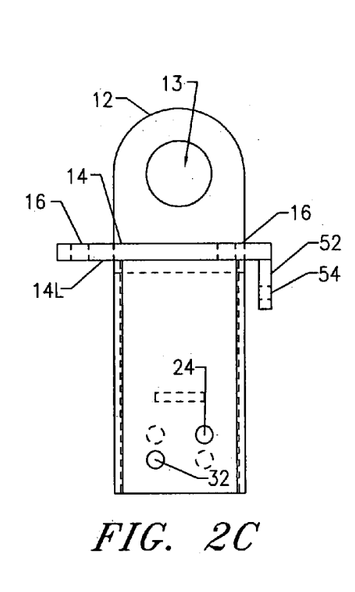
FIG. 2C is an end view of the upper bracket of FIG. 2.
Figure 2D:
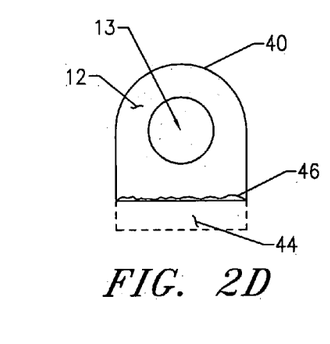

FIG. 2A is a side view; FIG. 2B is a bottom view; and FIG. 2C is an end view of the upper bracket 50 illustrated in FIG. 2, and collectively illustrates the alternative embodiment of the lifting bracket, with fastening member 52 affixed to plate 14. As noted above, this embodiment illustrates an alternative shape of stiff-back brackets 18-1 and 20-1, as would be used in lighter duty form construction.

Figure 3:
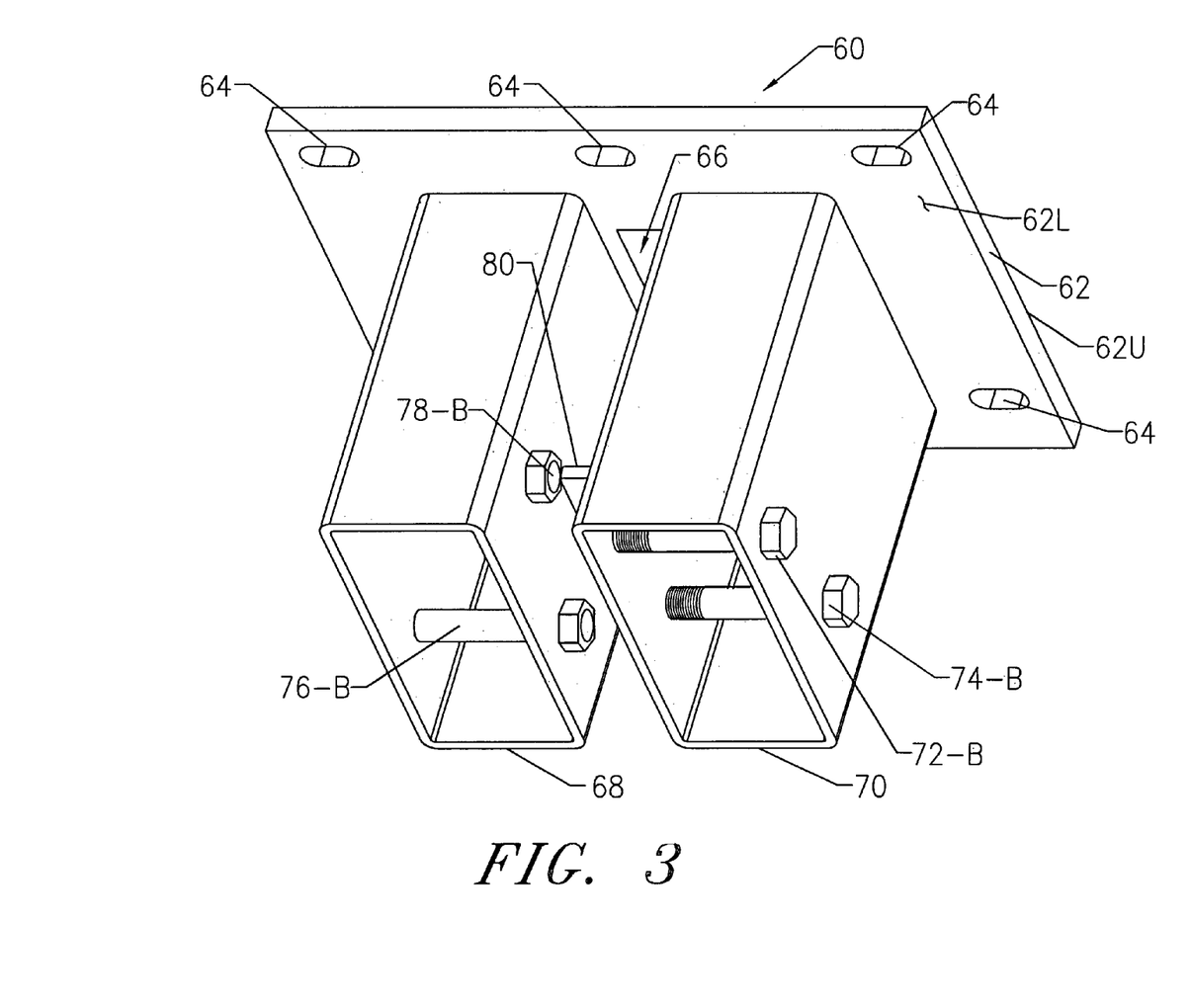
FIG. 3 is a perspective view of one embodiment of a lower bracket adapted to mate with an associated upper bracket of the type illustrated in FIG. 1 and FIG. 2.

FIG. 3 is a perspective view of a lower bracket configured to mate with an upper bracket of the type illustrated in FIG. 1 and FIG. 2. Lower bracket 60, also referred to as a base bracket, includes a base plate 62, which has an upper surface 62U, a lower surface 62L, and a number of holes 64 therethrough. Holes 64 are arranged in a predetermined configuration to align with associated ones of the holes 16 in an upper bracket. Base plate 62 has a rectangular shaped slot 66 that has a predetermined shape that approximates the cross-sectional shape of lifting member 12, as described above, and is adapted to slidably receive lifting member 12 when the mating surface 14U of an upper bracket is brought in contact with the mating surface 62U of the lower bracket. A pair of brackets 68 and 70 is positioned on either side of slot 66 and affixed to surface 62L of base plate 62, as for example by welding, and together comprise a mounting structure. It is of course understood that references to 'upper' and 'lower' surfaces are for relational descriptions only, and do not necessarily describe the positioning of the references surfaces when the mating brackets are assembles as part of a double waler stiff-back structure. As described above, brackets 68 and 70 are illustrated having substantially rectangular openings adapted to receive ends of associated waler members (not shown here). The size and shape of the openings in the brackets 68 and 70 will be determined by the strength requirements and the cross-sectional dimensions of the associated waler members to be used. Bolts 72B and 74B are utilized to retain a waler member in bracket 70, and bolts 76B and 78B are utilized to retain a waler member in bracket 68. Additional bolts may be utilized as necessary. Other forms of fastening devices, such as lag screws or the like, can be utilized provided sufficient holding strength is provided for the strength design of stiff-back structure to be utilized. Stiffening member 80 is affixed between brackets 68 and 70, and provides additional strength to resist twisting, deflection, or bending brackets 68 and 70 when in use.

Figure 3A:
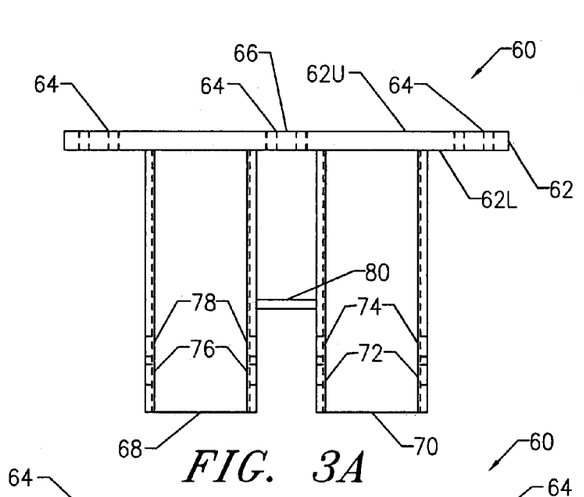
FIG. 3A is a top view of the lower bracket of FIG. 3.
Figure 3B:
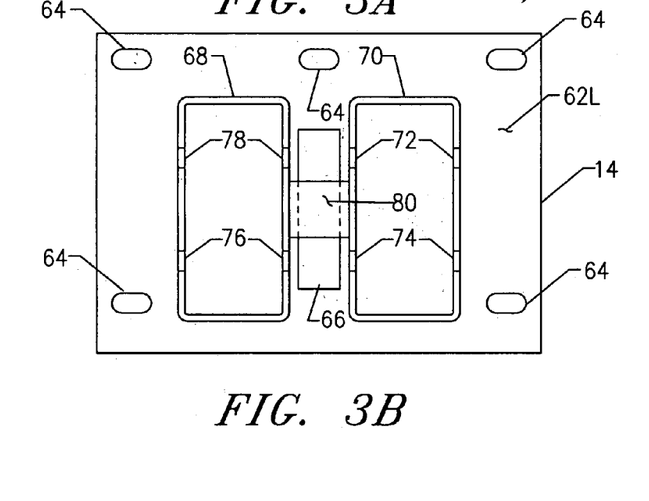
FIG. 3B is a side view of the lower bracket of FIG. 3.
Figure 3C:
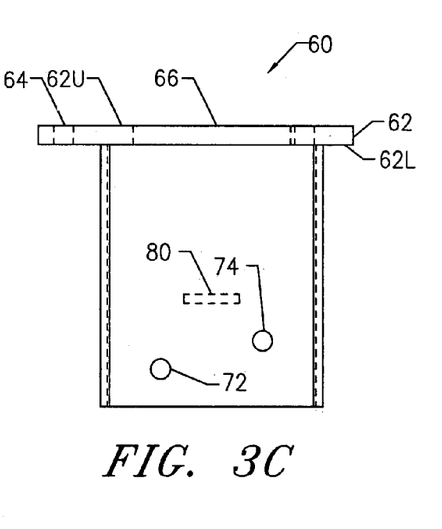
FIG. 3C is an end view of the lower bracket of FIG. 3.

FIG. 3A is a side view; FIG. 3B is a bottom view; and FIG. 3C presents an end view of the lower bracket 60 illustrated in FIG. 3; and, collectively, illustrate its form. The shape of slot 66 is such that it substantially matches the cross-sectional shape of lifting member 12. The arcuate leading surface 40 of lifting member 12 functions to position lifting member 12 as it is inserted in slot 66, thereby assisting in aligning the mounting holes 16 in an upper bracket 10 or 50 with the holes 64 in a lower bracket 60 such that the mating brackets can be joined together.

Figure 4:
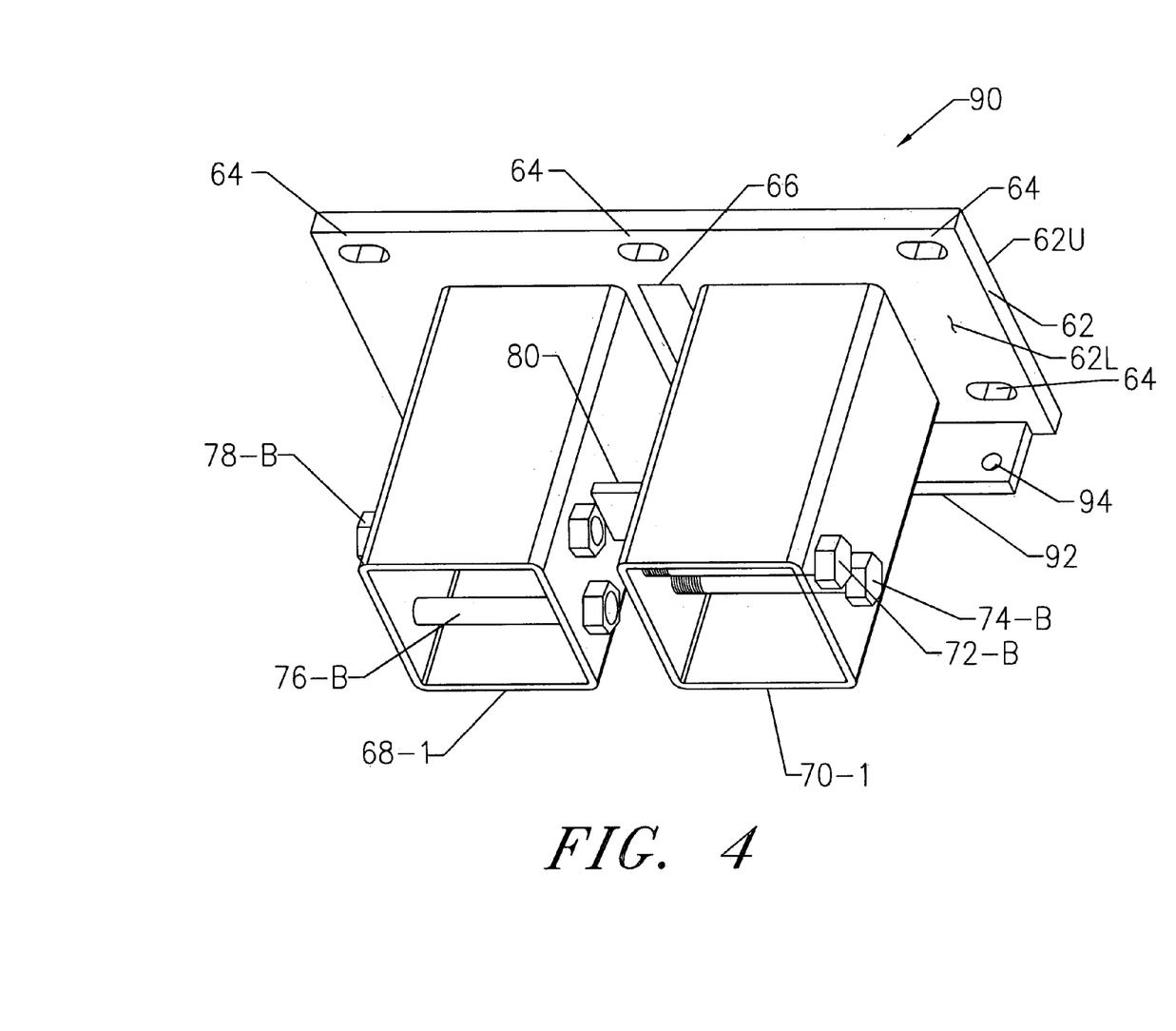
FIG. 4 is a perspective view of an alternative embodiment of a lower bracket.

FIG. 4 is a perspective view of an alternative embodiment of a lower bracket. This alternative embodiment 90 of a lower bracket includes the elements described with respect to FIG. 3, and has an additional fastening member 92 affixed, for example as by welding, to lower surface 62L of plate 62. Fastening member 92 extends across a substantial portion of the length of plate 62, and extends downwardly therefrom. Fastening member 92 has a plurality of holes 94 positioned along its length. As will be described in more detail below, these holes 94 will be utilized to receive screws or bolts, or the like, to affix the bracket to an associated form panel. It is understood that a similar fastening member 92 can and will be used with a lower bracket 60. This embodiment also illustrates the use of brackets 68-1 and 70-1, each having a substantially square opening for use with waler members having a substantially similar square cross-section. As previously described, the square stiff-back brackets 68-1 and 70-1 are used with lighter duty panels that require additional stiff-back strength.

Figure 4A:
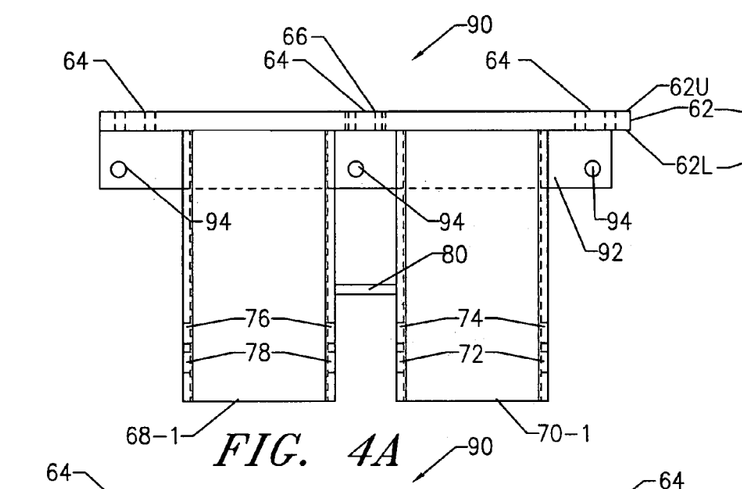
FIG. 4A is a side view of the lower bracket of FIG. 4.
Figure 4B:
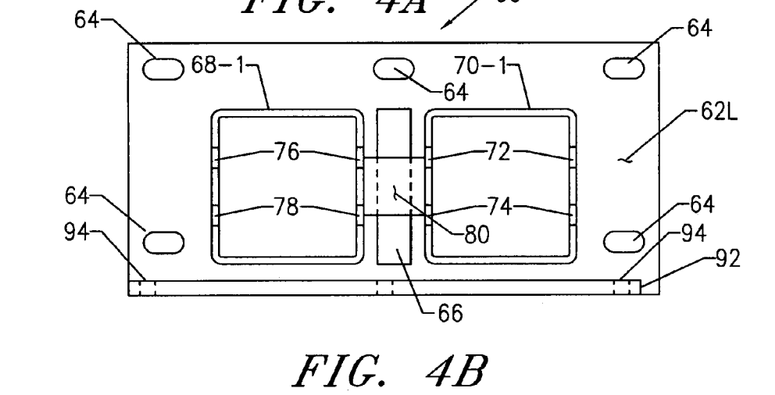
FIG. 4B is a bottom view of the lower bracket of FIG. 4.
Figure 4C:
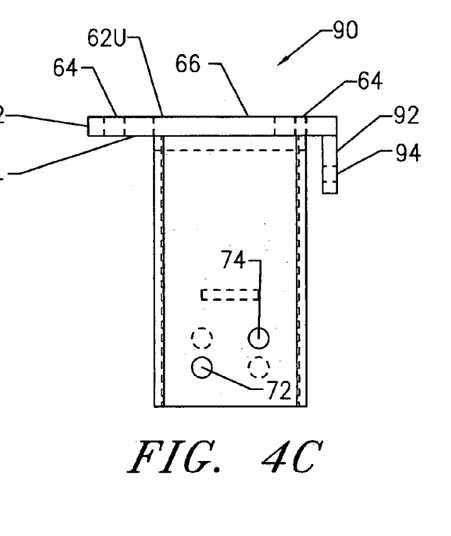
FIG. 4C is an end view of the lower bracket of FIG. 4.

FIG. 4A is a side view; FIG. 4B is a bottom view; and FIG. 4C illustrate an end view of the lower bracket 90 illustrated in FIG. 4; and, collectively, illustrate the alternative embodiment 90 of the lower bracket. As noted above, this embodiment illustrates the addition of fastening member 92 and an alternative shape of stiff-back brackets 68-1 and 70-1, as would be used for lighter duty form construction.

From the foregoing it will be understood that shapes of brackets 18 and 20; 18-1 and 20-1; 68 and 70; and 68-1 and 70-1 can be selected to accommodate the cross-sectional shapes of waler member that are to be mounted, and are not limited to rectangular or square, though such will be the most common shapes. Similarly, the number of mating holes 16 and 64 positioned on three sides of plates 14 and 62, respectively, can be varied as needed to accommodate sufficient joining bolts, as will be illustrated below, to provide the strength necessary to join modular panels without bending or distortion. Finally, the number, positioning and sizing of the holes to accommodate bolts 24B, 28B, 30B, and 32B in an upper bracket and bolts 72B, 74B, 76B, and 78B in a lower bracket can be selected as necessary to provide the holding strength required, without departing from the invention.

Figure 5:
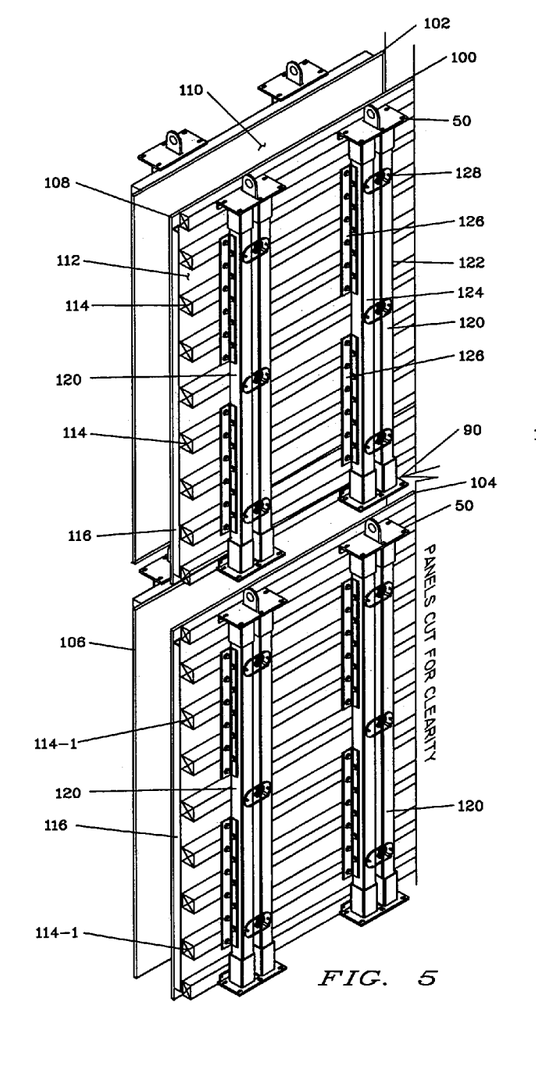
FIG. 5 is a perspective view of broken away portion of an upper panel and a broken away portion of a lower panel positioned for being joined to form one side of space-apart set of form structures.

FIG. 5 is perspective view of a broken away portion of an upper panel and a broken away portion of a lower panel positioned for being joined to form one side of a spaced-apart set of form structures. The panels are cut away such that only portions of the panels are illustrated. Upper modular panels 100 and 102 are spaced apart forming a defined opening therebetween. Similarly, modular panels 104 and 106 are spaced apart forming a similar defined opening, such defined openings defining the thickness of hardenable material, such as concrete, that may be installed therein. Panel 100 has a smooth forming surface 108 oppositely disposed from forming surface 110 of panel 102. Rear surface 112 of panel 100 has a plurality of spaced-apart structural members 114 affixed thereto, and rear surface 112-1 of panel 104 has a plurality of spaced-apart structural members 114-1 affixed thereto, such members 114 and 114-1 being collectively referenced as studs 114. The modular panels or sheathing are characteristically made with construction grade plywood, or similar structural materials. The structural members described as studs 114, are illustrated in the horizontal orientation, but it should be understood that they could equally be arranged in a perpendicular orientation. The number, spacing, and sizing of studs 114, will vary for different panel designs and will be determined for the size of the modular panels and the weight concentration of the non-hardened (liquid) concrete that will be formed, it being understood that members 114 will be required to have sufficient strength such that the forming surface 108 will remain substantially planar when the concrete is poured between the panels. Each panel has an angle iron 116, which angle irons have a plurality of holes disposed their respective lengths, and are arranged to cooperate with similarly arranged angle irons on panels that are positioned end-to-end. When thus positioned, as will be described in more detail below, cooperating angle irons can be bolted together to firmly join the panels and prevent leakage of material between the panels.

A number of stiff-backs 120 are affixed to studs 114 of the panels. The number and spacing of the stiff-backs 120 will depend upon the length of the associated panel, the height and weight of the associated panel, and the over-all stiffening requirements for the material to be formed. The stiff-back members on panel 100 must be mounted to vertically align with the stiff-back members on panel 104, such that the lower brackets 90 on panel 100 will mate with the lifting brackets 50 on panel 104 and they can be joined together when panel 100 is lowered toward panel 104.

A characteristic stiff-back structure has an upper bracket 50 and a lower bracket 90, to which a pair of waler members 122 and 124 is affixed. As shown, waler members 122 and 124 are substantially square in cross-section and are of a length to substantially span the height of the associated panel. Members 122 and 124 are spaced apart due to the upper and lower bracket mounting configurations. It is of course understood that the bracket configuration could alternatively be an upper bracket 10 and a lower bracket 60 to accommodate rectangular cross-section stiff-back members.

Stiff-back 120 has one or more angle iron structures 126 affixed to stiff-waler 124, and has one or more angle iron structures (not shown) affixed to waler 122. These will be described in more detail in FIG. 6. These angle iron structures have a plurality of holes disposed along their respective lengths and are arranged such that screws, or other suitable fastening devices, can be utilized to join the angle iron structures 126 to the stiff-back member and to the studs 114.

In concrete forming structures it is known to utilized cross-ties to join the oppositely disposed form panels to each other and to assist in preventing bowing or displacement of the form panels. Characteristically, the cross-ties (not shown) are of some material, such as a metal, that can be used during forming and then left in place after the forms are removed. Various methods have been utilized to affix the cross-ties to form panels. A commercially available system utilizes brackets 128 to both grip and tighten the cross-tie wire structures, and can then be released when the form panel is to be removed.

Figure 6:
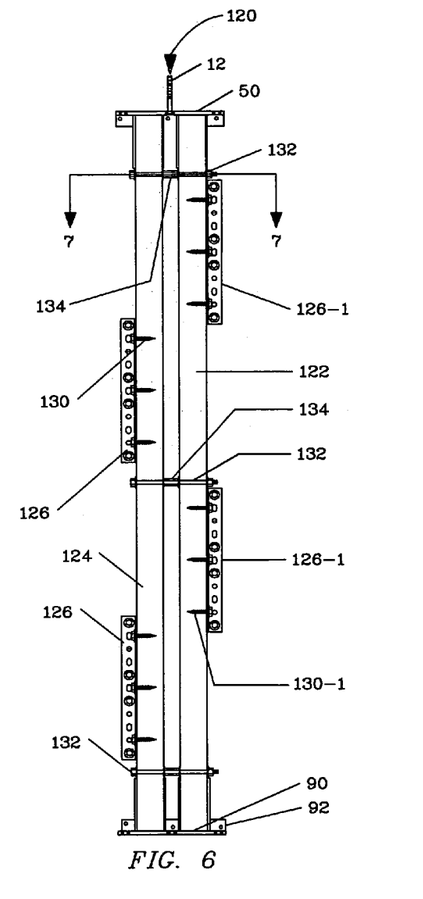
FIG. 6 is a face assembly view of a stiff-back structure comprised of a pair of spaced-apart stiff-back members with their associated lifting bracket and lower bracket.

FIG. 6 is a face assembly view of double waler stiff-back structure 120 comprised of a pair of spaced-apart waler members 122 and 124 with their associated lifting bracket 50 and lower bracket 90, as described in FIG. 5. Brackets 50 and 90 are affixed to the members 122 and 124 as described above. Angle iron structures 126 are affixed to member 122 by a number of screws 130, or other suitable fastening structures; and angle iron structures 126-1 are affixed to member 124 by a number of screws 130-1, or other suitable fastening structures. Though two angle iron structures 126 and 126-1 are illustrated with respect to each of the waler members 122 and 124, it should be understood that more or fewer such angle iron structures can be utilize depending upon the requirements of the total panel engineered design.

For additional stability and prevention of warping or twisting of members 122 and 124, it has been found advantageous to utilize a plurality of nuts and bolts 132 and associated spacers 134 to hold waler members 122 and 124 in aligned spaced-apart relationship with each other. The number and spacing of bolts 132 and spacers 134 will depend upon the desired rigidity and over all length of the stiff-back 120.

Figure 7:
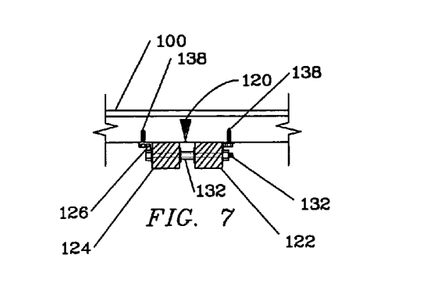
FIG. 7 is a cross-section view taken at line 7-7 in FIG. 6.

FIG. 7 is cross-sectional view taken at line 7-7 in FIG. 6. The stiff-back 120 utilized waler members 122 and 124 and spacer 134 is shown as a tubular structure having a length to define the spacing between members 122 and 124. Alternatively, the spacer structure could be a number of washers, or the like, which when stacked would define the spacing. The stiff-back structure is affixed to a number of the studs 114 by screws 138 through angle irons 126 and 126-1.

Figure 8:
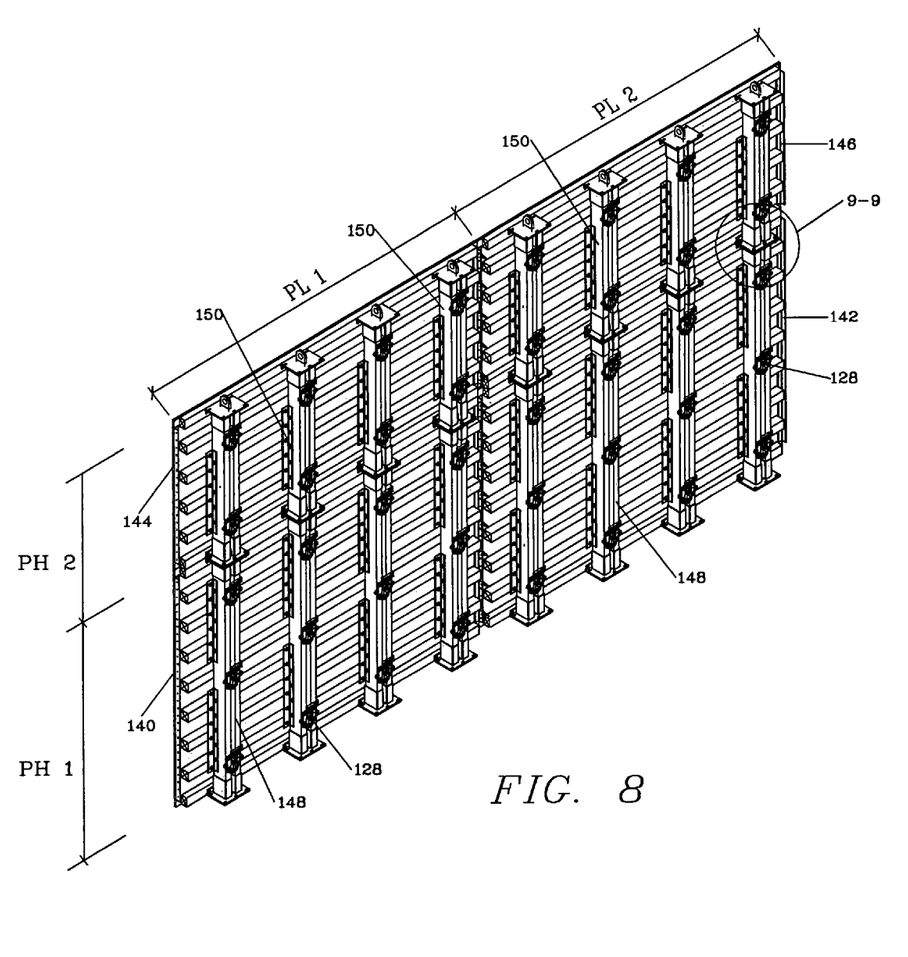
FIG. 8 is a perspective view of four modular panels assembled to form a wall formwork.

FIG. 8 is a perspective view of four modular panels assembled to form a wall formwork. Lower panels 140 and 142 each have a panel height PH1, which for illustrative purposes can be ten feet, and upper panels 144 and 146 each have a panel height PH2 of four feet, thus giving a form wall height of fourteen feet. In practice various panels will be engineered having height multiples that can be assembled to obtain a form wall of the desired height. Lower panel 140 and upper panel 144 are illustrated with a panel length PL1, which illustratively can be sixteen feet, and lower panel 142 and upper panel 146 have similar panel lengths PL2, which illustratively can be eight feet. When combined this illustrative form wall would have an over-all length twenty-four feet and over-all height of fourteen feet. It can be seen, then, that with a number of pre-engineered and pre-formed panels of varying dimensions, that various dimensioned form walls can be quickly be assembled. The modular structure is such that form walls can be constructed of assembled modular panels having as many panels as are needed to form the required length of the form wall, and having as many stacked panels as necessary to form the required height of the form wall. To this end, the stiff-backs 148 for panels 140 and 142 will be assembled each having a length substantially approximating PH1, and the stiff-backs 150 for panels 144 and 146 will be assembled each having a length approximating PH2. The number of cross-tie couplings or brackets 128 will be selected as necessary for the length of the particular stiff-back. Each modular panel is affixed to its next associated upper panel by interconnecting the mated upper lifting bracket of a panel with the mated lower bracket of the upper panel. An illustrative coupling of brackets shown within line 9-9 will be described in detail with respect to FIG. 9.

Figure 9:
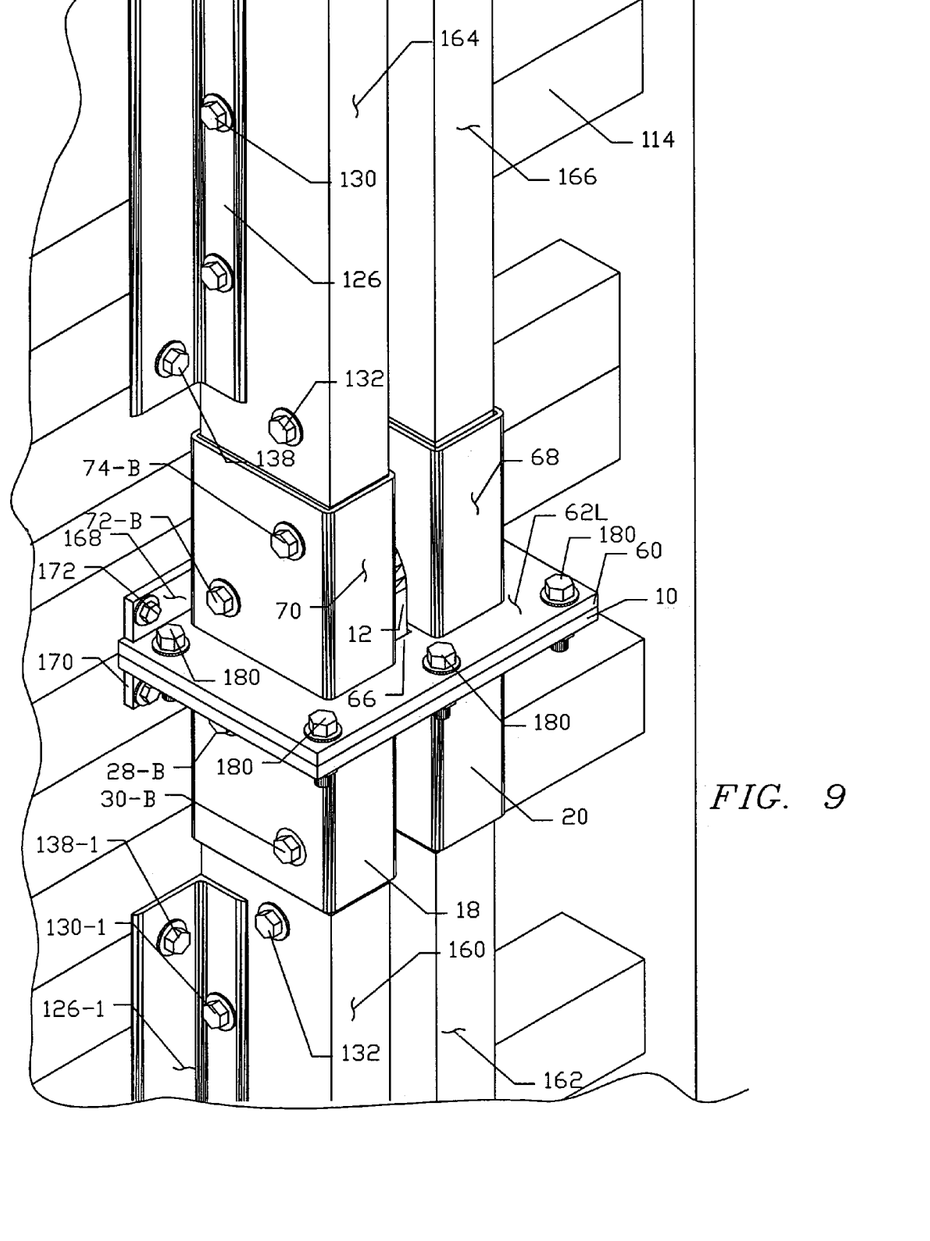
FIG. 9 is an enlarged perspective view of a bracket assembly taken within line 9-9 in FIG. 8.

FIG. 9 is an enlarged perspective view of a bracket assembly taken within line 9-9 in FIG. 8. As shown, upper lifting bracket 10 has stiff-back members 160 and 162 mounted in brackets 18, by bolts 28B and 30B, and to bracket 20, by bolts not shown. Base bracket 60 has waler members 164 mounted in bracket 70, by bolts 72B and 74B, and waler member 166 in bracket 68 by bolts not shown here. Lifting member 12 is inserted through slot 66. Angle iron 126 is coupled to a number of studs by a number of screws, of which screw 138 is shown, and to waler member 164 by a number of screws, of which screw 130 is shown. Similarly, angle iron 126-1 is coupled to a number of studs by a number of screws, such as screw 138-1 and to waler member 160 by a number of screws, such as screw 130-1. In the configuration shown, upper lifting bracket 10 and lower base bracket 60 each have an associated fastening member 168 and 170, respectively. Fastening member 168 is affixed to a stud on its associated panel by a number of screws, of which screw 172 is shown, and fastening member 170 is affixed to its panel by a number of screws such as screw 174. It is of course understood that references to screws includes other fastening devices that are equivalent. Finally, in one embodiment, a plurality of fastening structures, such as a number of bolts 180, with associated nuts, are positioned in their respectively associated mating holes in the brackets, and hold the mating brackets firmly together when the nuts are tightened. The size and number of bolts 180 will be selected to have sufficient strength to withstand that lateral pressures that may be applied, and to support the combined weight of multiple stacked panels that may be lifted.

Figure 10:
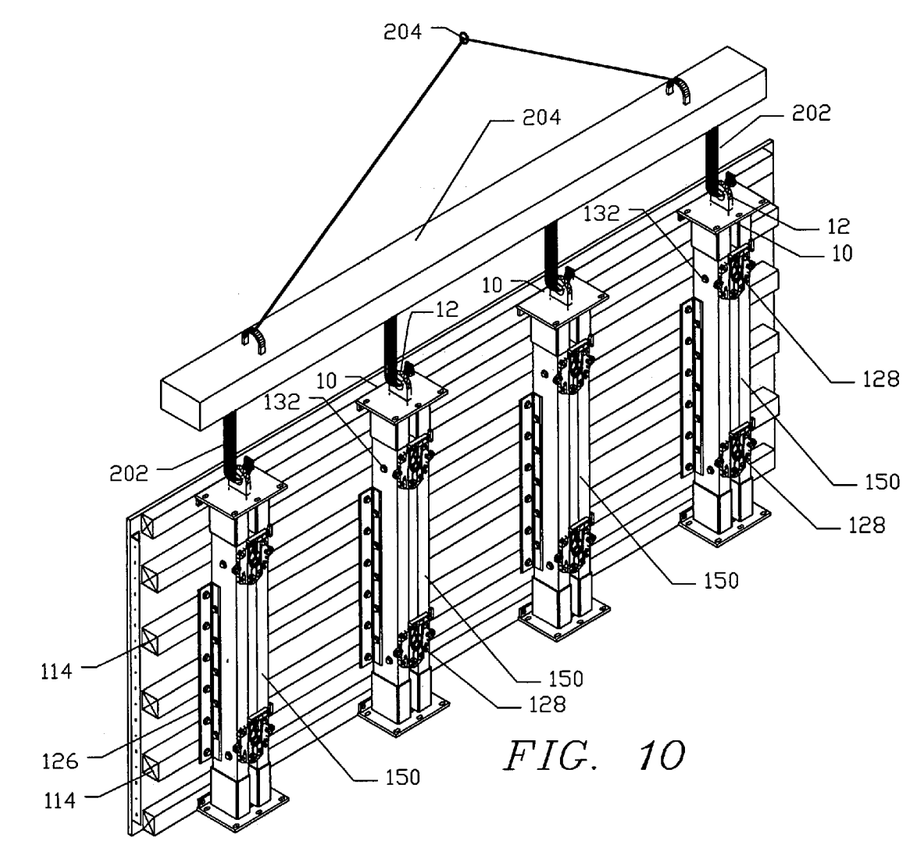
FIG. 10 is a perspective view of a modular form panel and a lifting mechanism.

FIG. 10 is a perspective view of a modular form panel and a lifting mechanism. When lifting the modular panels, it is desirable that the lift be applied to all of the stiff-back structures in substantially a perpendicular direction. To this end, a lifting beam 200 is equipped with a number of hooks 202 that matches the number of stiff-back structures for the particular panel. For illustration, panel 144 described in FIG. 8 is shown having four upper lifting brackets 10 and associated lifting elements 12, each engaged by a hook 202. Power can be applied from a source, not shown, to cable 204 to raise or lower the panel 144. As previously noted, the panels involved can vary in length and can vary in the number and spacing of stiff-back structures. To accommodate these variations, beam 200 includes structure (not shown) to allow additional hooks 202 to be utilized, and to allow adjustment of the spacing between hooks 202 by moving them as needed in the direction of arrow 206.

From the foregoing detailed description of the invention it can be seen that a number of aspects and purposes of the invention have been satisfied. It is understood that various modifications of materials, structure, interrelationship of parts, and features will become apparent to those skilled in the art without departing from the spirit and scope of the invention. Accordingly, what is intended to be protected is set forth in the appended Claims.

I claim:

1. For use with a modular construction system including a number of modular panels, a joining structure comprising:
    a first bracket for cooperating with a first modular panel, said first bracket including a first base plate having a first surface and a second surface oppositely disposed, and having a slot therethrough, a first plurality of mounting holes arranged along a first predetermined portion of the periphery of said first base plate, and a first mounting structure at said first surface and adapted for coupling to the first modular panel; and
    a second bracket for cooperating with a second modular panel, said second bracket including a second base plate having a third surface to engage said second surface and a fourth surface oppositely disposed, a second plurality of mounting holes arranged along a first predetermined portion of the periphery of said second base plate and further arranged to align with said first plurality of mounting holes, a second mounting structure at said fourth surface and adapted for coupling to the second modular panel, and a lifting and positioning structure at said third surface, wherein said lifting and positioning structure has an arcuate outer surface for aiding in positioning the structure, said lifting and positioning structure arranged for use in lifting said second bracket and to position said first bracket with respect to said second bracket and to extend through said slot,
    whereby said first bracket and said second bracket can cooperate in an interactive manner for joining said first modular panel and said second modular panel.

2. A joining structure as in claim 1, wherein said lifting and positioning structure includes a hole therethrough to allow engagement with a lifting mechanism.

3. A joining structure as in claim 2, wherein said lifting and positioning structure extends substantially perpendicular to said third surface.

4. A joining structure as in claim 1, wherein said first mounting structure includes a first stiff-back bracket affixed to said first surface and a second stiff-back bracket mounted to said first surface, said first stiff-back bracket and said second stiff-back bracket spaced apart on opposite sides of said slot and each having a predetermined length and shape, whereby ends of a first pair of stiff-back members can be engaged and affixed to said first bracket.

5. A joining structure as in claim 4, and further including a first stiffening member affixed between said first stiff-back bracket and said second stiff-back bracket.

6. A joining structure as in claim 1, wherein said second mounting structure includes a third stiff-back bracket affixed to said fourth surface and a fourth stiff-back bracket affixed to said fourth surface, said third stiff-back bracket and said fourth stiff-back bracket spaced apart and each having a predetermined length and shape, whereby ends of a second pair of stiff-back members can be engaged and affixed to said second bracket.

7. A joining structure as in claim 6, and further including a second stiffening member affixed between said third stiff-back bracket and said fourth stiff-back bracket.

8. A joining structure as in claim 1, wherein said slot has a predetermined shape and said lifting and positioning structure has a cross-section in proximity to said third surface that approximates said predetermined shape and allows said lifting and positioning structure to slidably engage said slot and pass therethrough.

9. A joining structure as in claim 1 and further including a plurality of fastening structures inserted within said first plurality of mounting holes in said first bracket and inserted within the respectively aligned plurality of mounting holes in said second bracket, whereby said first bracket and said second bracket may be removably fastened together.

10. A joining structure as in claim 9 wherein each of said plurality of fastening structures includes a bolt with an associated nut.

11. A joining structure as in claim 1, and further including a first fastening member affixed along a second predetermined portion of the periphery of said first base plate and substantially perpendicular to said first surface, said first fastening member including a plurality holes positioned along its length.

12. A joining structure as in claim 1, and further including a second fastening member affixed along a second predetermined portion of the periphery of said second base plate and substantially perpendicular to said fourth surface, said second fastening member including a plurality holes positioned along its length.

* * * * *